United States Patent
Xing

(10) Patent No.: US 9,866,682 B2
(45) Date of Patent: Jan. 9, 2018

(54) METHOD FOR PROCESSING NON-ACCESS STRATUM MESSAGE, USER EQUIPMENT, AND NETWORK SIDE DEVICE

(71) Applicant: Huawei Technologies Co., Ltd., Shenzhen, Guangdong (CN)

(72) Inventor: Pingping Xing, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/054,543

(22) Filed: Feb. 26, 2016

(65) Prior Publication Data

US 2016/0182711 A1   Jun. 23, 2016

(51) Int. Cl.
*H04W 24/00* (2009.01)
*H04M 3/22* (2006.01)
*H04W 48/08* (2009.01)
*H04W 16/32* (2009.01)
*H04W 8/22* (2009.01)
*H04W 88/06* (2009.01)
*H04W 88/14* (2009.01)

(52) U.S. Cl.
CPC ....... *H04M 3/2263* (2013.01); *H04M 3/2227* (2013.01); *H04W 16/32* (2013.01); *H04W 48/08* (2013.01); *H04W 8/22* (2013.01); *H04W 88/06* (2013.01); *H04W 88/14* (2013.01)

(58) Field of Classification Search
CPC . H04M 3/2263; H04M 3/2227; H04W 16/32; H04W 48/08; H04W 88/06; H04W 88/14
USPC ........ 455/424, 525.1, 552.1, 553.1; 370/329, 370/319, 337, 331
See application file for complete search history.

(56) References Cited

U.S. PATENT DOCUMENTS

2007/0254666 A1\* 11/2007 De Jong ............... H04W 36/14
 455/436
2008/0198804 A1\* 8/2008 Rahman ............ H04W 36/0011
 370/331

(Continued)

FOREIGN PATENT DOCUMENTS

| CN | 101155390 A | 4/2008 |
|----|-------------|--------|
| CN | 101370197 A | 2/2009 |
| CN | 101951666 A | 1/2011 |

*Primary Examiner* — Kamran Afshar
*Assistant Examiner* — Farid Seyedvosoghi

(57) ABSTRACT

The present application discloses a method for processing a non-access stratum message, user equipment, and a network side device. The user equipment includes a configuration module, at least one non-access stratum module, and at least two access stratum modules, and the at least two access stratum modules separately support different network standards, where the configuration module is configured to acquire configuration information, and map the at least one non-access stratum module to at least one of the access stratum modules according to the configuration information, so that the at least one non-access stratum module transfers a non-access stratum message with the access stratum module to which mapping is performed. According to the present invention, a technical problem that a mapping relationship between an access stratum and a non-access stratum in prior-art user equipment is fixed can be resolved, signaling interactions can be reduced, and a delay can be shortened.

17 Claims, 5 Drawing Sheets

(56) References Cited

U.S. PATENT DOCUMENTS

| | | | |
|---|---|---|---|
| 2009/0232097 A1* | 9/2009 | Taneja | H04W 36/02 370/331 |
| 2013/0005397 A1 | 1/2013 | de Jong et al. | |
| 2013/0044709 A1* | 2/2013 | Adjakple | H04W 76/025 370/329 |
| 2013/0217438 A1 | 8/2013 | Zhao | |

* cited by examiner

METHOD FOR PROCESSING NON-ACCESS STRATUM MESSAGE, USER EQUIPMENT, AND NETWORK SIDE DEVICE

CROSS-REFERENCE TO RELATED APPLICATIONS

This application is a continuation of International Application No. PCT/CN2013/082647, filed on Aug. 30, 2013, which is hereby incorporated by reference in its entirety.

TECHNICAL FIELD

Embodiments of the present invention relates to the field of wireless communications technologies, in particular, to a method for processing a non-access stratum message, and further, to user equipment and a network side device.

BACKGROUND

With development of wireless communications, update of wireless networks in many areas has already started, and it is already attempted that a conventional 2G (2nd Generation) network is replaced with a 3G (3rd Generation) network or a 4G (4rd Generation) network. However, in many areas, because the 2G network is relatively mature and comprehensive, the 2G network will still be used in a relatively long period of time, which causes a phenomenon that the 2G network and the 3G/4G network coexist. The 2G network is generally in a GSM standard, the 3G network is generally in a UMTS standard, and the 4G network is generally in an LTE standard.

Currently, GSM, UMTS, and LTE networks coexist in a networking manner, and the networking refers to that a macro cell and a micro cell form a network, where the macro cell and the micro cell may be in a same network standard, or may be in different network standards. In this case, user equipment needs to have an access stratum (AS) and a non-access stratum (NAS) that support multiple network standards, and an access stratum in each network standard is in a one-to-one correspondence with only a non-access stratum in the network standard.

An inventor of the present invention finds in a long-term research and development that, for user equipment supporting multiple network standards, the user equipment communicates with a core network by using an access network, and because a mapping relationship between an access stratum and a non-access stratum in the user equipment is fixed, when the user equipment switches a network standard, not only the user equipment needs to switch the access stratum that performs a signaling interaction with the access network, but also an interface between the access network and the core network needs to be switched. In this way, a non-access stratum message sent by the core network can be processed by the non-access stratum, which corresponds to a network standard of the non-access stratum message, of the user equipment. Therefore, when the prior-art user equipment accesses a network in which multiple network standards coexist, a signaling interaction is complex, a delay is relatively long, and it is not flexible enough.

SUMMARY

In view of this, embodiments of the present invention provides a method for processing a non-access stratum message, user equipment, and a network side device, so as to resolve a technical problem that a mapping relationship between an access stratum and a non-access stratum in prior-art user equipment is fixed.

A first aspect of embodiments of the present invention provides user equipment, where the user equipment includes a configuration module, at least one non-access stratum module, and at least two access stratum modules, and the at least two access stratum modules separately support different network standards, where the configuration module is configured to acquire configuration information, and map the at least one non-access stratum module to at least one of the access stratum modules according to the configuration information, so that the at least one non-access stratum module transfers a non-access stratum message with the access stratum module to which mapping is performed.

With reference to the first aspect, in a first possible implementation manner of the first aspect, the configuration information is received from a network side device by one of the access stratum modules, and is sent to the configuration module.

With reference to the first possible implementation manner of the first aspect, in a second possible implementation manner of the first aspect, the access stratum module to which mapping is performed is configured to receive a non-access stratum message from the network side device, and send the non-access stratum message to the at least one non-access stratum module, to process the non-access stratum message.

With reference to the first or second possible implementation manner of the first aspect, in a third possible implementation manner of the first aspect, the at least one non-access stratum module is configured to generate a non-access stratum message, and send the non-access stratum message to the access stratum module to which mapping is performed, and the access stratum module to which mapping is performed sends the non-access stratum message to the network side device.

With reference to the third possible implementation manner of the first aspect, in a fourth possible implementation manner of the first aspect, when there are at least two access stratum modules to which mapping is performed, the configuration module is further configured to specify, according to the configuration information, one of the access stratum modules to which mapping is performed to receive a non-access stratum message from the network side device or to send a non-access stratum message to the network side device.

With reference to the third possible implementation manner of the first aspect, in a fifth possible implementation manner of the first aspect, when there are at least two access stratum modules to which mapping is performed, the configuration module is further configured to compare priorities of the access stratum modules to which mapping is performed, and select an access stratum module to which mapping is performed and that has a highest priority to receive a non-access stratum message from the network side device or to send a non-access stratum message to the network side device.

With reference to the fifth possible implementation manner of the first aspect, in a sixth possible implementation manner of the first aspect, the priority is quality of transmission between the access stratum module to which mapping is performed and the network side device.

With reference to the fourth or fifth possible implementation manner of the first aspect, in a seventh possible implementation manner of the first aspect, when there are at least two non-access stratum modules, the at least two non-access stratum modules support different network standards, and the access stratum module to which mapping is performed is specifically configured to receive a non-access stratum message from the network side device, parse a network standard of the non-access stratum message, and send the non-access stratum message to the non-access stratum module that corresponds to the network standard, to process the non-access stratum message.

With reference to the fourth or fifth possible implementation manner of the first aspect, in an eighth possible implementation manner of the first aspect, when the at least one non-access stratum module generates a non-access stratum message, the configuration module is further configured to set a network standard of the non-access stratum message, so that the network side device parses the network standard of the non-access stratum message after receiving the non-access stratum message.

With reference to the seventh possible implementation manner of the first aspect, in a ninth possible implementation manner of the first aspect, the network standards supported by the at least two access stratum modules are Universal Mobile Telecommunication System UMTS, Global System for Mobile Communications GSM, Long Term Evolution LTE, or Wireless Fidelity WIFI, and the network standards supported by the at least two non-access stratum modules are UMTS, GSM, or LTE.

A second aspect of embodiments of the present invention provides user equipment, where the user equipment includes a configuration module, at least one access stratum module, and at least two non-access stratum modules, and the at least two non-access stratum modules separately support different network standards, where the configuration module is configured to acquire configuration information, and map the at least one access stratum module to at least one of the non-access stratum modules according to the configuration information, so that the at least one access stratum module transfers a non-access stratum message with the non-access stratum module to which mapping is performed.

With reference to the second aspect, in a first possible implementation manner of the second aspect, the configuration information is received from a network side device by the at least one access stratum module, and is sent to the configuration module.

With reference to the first possible implementation manner of the second aspect, in a second possible implementation manner of the second aspect, the at least one access stratum module is configured to receive a non-access stratum message from the network side device, and send the non-access stratum message to the non-access stratum module to which mapping is performed, to process the non-access stratum message.

With reference to the first or second possible implementation manner of the second aspect, in a third possible implementation manner of the second aspect, the non-access stratum module to which mapping is performed is configured to generate a non-access stratum message, and send the non-access stratum message to the at least one access stratum module, and the at least one access stratum module sends the non-access stratum message to the network side device.

With reference to the third possible implementation manner of the second aspect, in a fourth possible implementation manner of the second aspect, when there are at least two access stratum modules, the at least two access stratum modules separately support different network standards, and the configuration module is further configured to specify, according to the configuration information, one of the access stratum modules to receive a non-access stratum message from the network side device or to send a non-access stratum message to the network side device.

With reference to the third possible implementation manner of the second aspect, in a fifth possible implementation manner of the second aspect, when there are at least two access stratum modules, the at least two access stratum modules separately support different network standards, and the configuration module is further configured to compare priorities of the access stratum modules, and select an access stratum module that has a highest priority to receive a non-access stratum message from the network side device or to send a non-access stratum message to the network side device.

With reference to the fifth possible implementation manner of the second aspect, in a sixth possible implementation manner of the second aspect, the priority is quality of transmission between the access stratum module and the network side device.

With reference to the fourth or fifth possible implementation manner of the second aspect, in a seventh possible implementation manner of the second aspect, the at least one access stratum module is specifically configured to receive a non-access stratum message from the network side device, parse a network standard of the non-access stratum message, and send the non-access stratum message to the non-access stratum module to which mapping is performed and that corresponds to the network standard, to process the non-access stratum message.

With reference to the fourth or fifth possible implementation manner of the second aspect, in an eighth possible implementation manner of the second aspect, when the non-access stratum module to which mapping is performed generates a non-access stratum message, the configuration module is further configured to set a network standard of the non-access stratum message, so that the network side device parses the network standard of the non-access stratum message after receiving the non-access stratum message.

With reference to the fourth or fifth possible implementation manner of the second aspect, in a ninth possible implementation manner of the second aspect, the network standards supported by the at least two access stratum modules are UMTS, GSM, LTE, or WIFI, and the network standards supported by the at least two non-access stratum modules are UMTS, GSM, or LTE.

A third aspect of embodiments of the present invention provides a method for processing a non-access stratum message, where the processing method includes: acquiring configuration information; and mapping at least one non-access stratum module to at least one of at least two access stratum modules according to the configuration information, so that the at least one non-access stratum module transfers a non-access stratum message with the access stratum module to which mapping is performed, where the at least two access stratum modules separately support different network standards.

With reference to the third aspect, in a first possible implementation manner of the third aspect, the configuration information is received from a network side device by one of the access stratum modules.

With reference to the first possible implementation manner of the third aspect, in a second possible implementation manner of the third aspect, the step of transferring, by the at least one non-access stratum module, a non-access stratum message with the access stratum module to which mapping is performed includes: receiving, by the access stratum module to which mapping is performed, a non-access stratum message from the network side device; and sending the non-access stratum message to the at least one non-access stratum module, to process the non-access stratum message.

With reference to the first or second possible implementation manner of the third aspect, in a third possible implementation manner of the third aspect, the step of transferring, by the at least one non-access stratum module, a non-access stratum message with the access stratum module to which mapping is performed includes: generating, by the at least one non-access stratum module, a non-access stratum message; sending the non-access stratum message to the access stratum module to which mapping is performed; and sending, by the access stratum module to which mapping is performed, the non-access stratum message to the network side device.

With reference to the third possible implementation manner of the third aspect, in a fourth possible implementation manner of the third aspect, when there are at least two access stratum modules to which mapping is performed, the processing method further includes: specifying, according to the configuration information, one of the access stratum modules to which mapping is performed to receive a non-access stratum message from the network side device or to send a non-access stratum message to the network side device.

With reference to the third possible implementation manner of the third aspect, in a fifth possible implementation manner of the third aspect, when there are at least two access stratum modules to which mapping is performed, the processing method further includes: comparing priorities of the access stratum modules to which mapping is performed, and selecting an access stratum module to which mapping is performed and that has a highest priority to receive a non-access stratum message from the network side device or to send a non-access stratum message to the network side device.

With reference to the fifth possible implementation manner of the third aspect, in a sixth possible implementation manner of the third aspect, the priority is quality of transmission between the access stratum module to which mapping is performed and the network side device.

With reference to the fourth or fifth possible implementation manner of the third aspect, in a seventh possible implementation manner of the third aspect, when there are at least two non-access stratum modules, the at least two non-access stratum modules support different network standards, and the step of transferring, by the at least one non-access stratum module, a non-access stratum message with the access stratum module to which mapping is performed specifically includes: receiving, by the access stratum module to which mapping is performed, a non-access stratum message from the network side device; parsing a network standard of the non-access stratum message; and sending the non-access stratum message to a non-access stratum module that corresponds to the network standard, to process the non-access stratum message.

With reference to the seventh possible implementation manner of the third aspect, in an eighth possible implementation manner of the third aspect, when the step of generating, by the at least one non-access stratum module, a non-access stratum message is performed, the processing method further includes: setting a network standard of the non-access stratum message, so that the network side device parses the network standard of the non-access stratum message after receiving the non-access stratum message.

With reference to the seventh possible implementation manner of the third aspect, in a ninth possible implementation manner of the third aspect, the network standards supported by the at least two access stratum modules are UMTS, GSM, LTE, or WIFI, and the network standards supported by the at least two non-access stratum modules are UMTS, GSM, or LTE.

A fourth aspect of embodiments of the present invention provides a method for processing a non-access stratum message, where the processing method includes: acquiring configuration information; and mapping at least one access stratum module to at least one of at least two non-access stratum modules according to the configuration information, so that the at least one access stratum module transfers a non-access stratum message with the non-access stratum module to which mapping is performed, where the at least two non-access stratum modules separately support different network standards.

With reference to the fourth aspect, in a first possible implementation manner of the fourth aspect, the configuration information is received from a network side device by the at least one access stratum module.

With reference to the first possible implementation manner of the fourth aspect, in a second possible implementation manner of the fourth aspect, the step of transferring, by the at least one access stratum module, a non-access stratum message with the non-access stratum module to which mapping is performed includes: receiving, by the at least one access stratum module, a non-access stratum message from the network side device; and sending the non-access stratum message to the non-access stratum module to which mapping is performed, to process the non-access stratum message.

With reference to the first or second possible implementation manner of the fourth aspect, in a third possible implementation manner of the fourth aspect, the step of transferring, by the at least one access stratum module, a non-access stratum message with the non-access stratum module to which mapping is performed includes: generating, by the non-access stratum module to which mapping is performed, a non-access stratum message; sending the non-access stratum message to the at least one access stratum module; and sending, by the at least one access stratum module, the non-access stratum message to the network side device.

With reference to the third possible implementation manner of the fourth aspect, in a fourth possible implementation manner of the fourth aspect, when there are at least two access stratum modules, the at least two access stratum modules separately support different network standards, and the processing method further includes: specifying, according to the configuration information, one of the access stratum modules to receive a non-access stratum message from the network side device or to send a non-access stratum message to the network side device.

With reference to the third possible implementation manner of the fourth aspect, in a fifth possible implementation manner of the fourth aspect, when there are at least two access stratum modules, the at least two access stratum modules separately support different network standards, and the processing method further includes: comparing priorities of the access stratum modules; and selecting an access stratum module that has a highest priority to receive a non-access stratum message from the network side device or to send a non-access stratum message to the network side device.

With reference to the fifth possible implementation manner of the fourth aspect, in a sixth possible implementation manner of the fourth aspect, the priority is quality of transmission between the access stratum module and the network side device.

With reference to the fourth or fifth possible implementation manner of the fourth aspect, in a seventh possible implementation manner of the fourth aspect, the step of transferring, by the at least one access stratum module, a non-access stratum message with the non-access stratum module to which mapping is performed specifically includes: receiving, by the at least one access stratum module, a non-access stratum message from the network side device; parsing a network standard of the non-access stratum message; and sending the non-access stratum message to the non-access stratum module to which mapping is performed and that corresponds to the network standard, to process the non-access stratum message.

With reference to the fourth or fifth possible implementation manner of the fourth aspect, in an eighth possible implementation manner of the fourth aspect, when the step of generating, by the non-access stratum module to which mapping is performed, a non-access stratum message is performed, the processing method further includes: setting a network standard of the non-access stratum message, so that the network side device parses the network standard of the non-access stratum message after receiving the non-access stratum message.

With reference to the fourth or fifth possible implementation manner of the fourth aspect, in a ninth possible implementation manner of the fourth aspect, the network standards supported by the at least two access stratum modules are UMTS, GSM, LTE, or WIFI, and the network standards supported by the at least two non-access stratum modules are UMTS, GSM, or LTE.

A fifth aspect of embodiments of the present invention provides a network side device, configured to connect user equipment to at least one core network, where the network side device includes a first transceiver module and a configuration module, where the configuration module is configured to generate configuration information, and send the configuration information to the first transceiver module; and the first transceiver module is configured to receive the configuration information from the configuration module, and send the configuration information to the user equipment, where the configuration information is used by the user equipment to map, according to the configuration information, at least one non-access stratum module to at least one of at least two access stratum modules or maps at least one access stratum module to at least one of at least two non-access stratum modules, where the at least two non-access stratum modules separately support different network standards, and the at least two access stratum modules separately support different network standards.

With reference to the fifth aspect, in a first possible implementation manner of the fifth aspect, the network side device further includes a second transceiver module, where the second transceiver module is configured to receive a non-access stratum message from a core network, and send the non-access stratum message to the first transceiver module; and the first transceiver module is further configured to receive the non-access stratum message from the second transceiver module, set a network standard of the non-access stratum message, and send the non-access stratum message to the user equipment, so that the user equipment parses the network standard of the non-access stratum message, and selects a non-access stratum module that corresponds to the network standard to process the non-access stratum message.

With reference to the first possible implementation manner of the fifth aspect, in a second possible implementation manner of the fifth aspect, the first transceiver module is further configured to receive a non-access stratum message from the user equipment, and send the non-access stratum message to the second transceiver module; and the second transceiver module is further configured to receive the non-access stratum message from the first transceiver module, parse the network standard of the non-access stratum message, and send the non-access stratum message to a core network that corresponds to the network standard.

To sum up, according to the method for processing a non-access stratum message, the user equipment, and the network side device in the embodiments of the present invention, at least one non-access stratum module is mapped to at least one of at least two access stratum modules according to acquired configuration information, which achieves an objective of changing a mapping relationship between an access stratum module and a non-access stratum module, can resolve a technical problem that a mapping relationship between an access stratum and a non-access stratum that are in prior-art user equipment is fixed, and can reduce signaling interactions, and shorten a delay.

The foregoing descriptions are merely an overview of the technical solutions of the present invention, and to understand the technical means of the present invention more clearly, implementation can be performed according to content of the specification. To make the foregoing and other objectives, features, and advantages of the present invention clearer and more comprehensible, the following is described in detail with reference to the accompanying drawings by using the embodiments.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
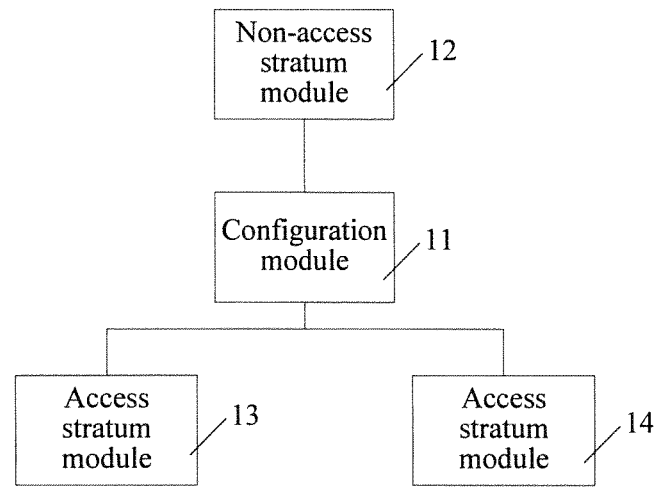
FIG. 1 is a schematic structural diagram of a first embodiment of user equipment according to the present invention.

Refer to FIG. 1, which is a schematic structural diagram of a first embodiment of user equipment according to the present invention. The user equipment includes a configuration module 11, a non-access stratum module 12, an access stratum module 13, and an access stratum module 14. The access stratum module 13 and the access stratum module 14 separately support different network standards.

The configuration module 11 is configured to acquire configuration information, and map the non-access stratum module 12 to at least one of the access stratum module 13 and the access stratum module 14 according to the configuration information, so that the non-access stratum module 12 transfers a non-access stratum message with the access stratum module 13 and/or the access stratum module 14 to which mapping is performed.

In this embodiment, network standards supported by the access stratum module 13 and the access stratum module 14 are GSM (Global System for Mobile Communications), UMTS (Universal Mobile Telecommunications System), LTE (Long Term Evolution), WIFI (Wireless Fidelity), or the like. A network standard supported by the non-access stratum module 12 is UMTS, GSM, LTE, or the like. It should be understood that, this embodiment exemplarily gives some network standards, but the present invention is not limited thereto, and other network standards may also be included in other embodiments.

Because the user equipment needs to be connected to a network so as to embody a communication function of the user equipment, in this embodiment, the configuration information is received from a network side device (not shown in the figure) by at least one of the access stratum module 13 and the access stratum module 14, and is sent to the configuration module 11.

If the user equipment does not access any network, and is in an initialized state, the configuration module 11 can also acquire the configuration information. In this case, the configuration information may be generated by a related module included by the user equipment and is sent to the configuration module 11, and the related module is, for example, an initialization module. The configuration module 11 establishes a default mapping relationship between the non-access stratum module 12 and the access stratum module 13 as well as the access stratum module 14 according to the configuration information. For example, if the non-access stratum module 12 and the access stratum module 13 support a same network standard, the non-access stratum module 12 is mapped to the access stratum module 13.

When the user equipment accesses a network, a network side device of the network adds the configuration information to dedicated signaling, a system message, or the like, so that the user equipment can receive the configuration information when accessing the network.

Because the non-access stratum module 12 is mapped to at least one of the access stratum module 13 and the access stratum module 14, it indicates that the non-access stratum module 12 not only may be mapped to the access stratum module 13 or the access stratum module 14, but also may be mapped to both the access stratum module 13 and the access stratum module 14. An application scenario of this embodiment is described below in detail by using two cases.

Assuming that the user equipment is in an initialized state, the non-access stratum module 12 is mapped to the access stratum module 13, the network standards supported by the non-access stratum module 12 and the access stratum module 13 are both GSM, and the network standard supported by the access stratum module 14 is UMTS.

Case 1: The user equipment accesses a GSM network, where the GSM network can mutually transmit non-access stratum message in GSM with the user equipment only through an air interface (radio interface) in UMTS because of mobility, a service, or the like. That is, the user equipment can establish a signaling interaction with the network side device only by using the access stratum module 14. The network side device needs to notify, in the configuration information, the user equipment that which access stratum module is used to connect to the network side device.

After receiving the configuration information from the network side device, the access stratum module 13 of the user equipment sends the configuration information to the configuration module 11; the configuration module 11 maps the non-access stratum module 12 to the access stratum module 14 according to the configuration information, and the access stratum module 14 performs a signaling interaction with the network side device, so that the non-access stratum module 12 transfers a non-access stratum message in GSM with the access stratum module 14 to which mapping is performed.

Case 2: A GSM network accessed by the user equipment may mutually transmit non-access stratum message in GSM with the user equipment through both an air interface in UMTS and an air interface in GSM. That is, the user equipment not only may establish a signaling interaction with the network side device by using the access stratum module 14, but also may establish a signaling interaction with the network side device by using the access stratum module 13. The network side device needs to notify, in the configuration information, the user equipment that which access stratum module is used to connect to the network side device.

After receiving the configuration information from the network side device, the access stratum module 13 of the user equipment sends the configuration information to the configuration module 11; the configuration module 11 maps the non-access stratum module 12 to both the access stratum module 13 and the access stratum module 14 according to the configuration information, and the access stratum module 13 and the access stratum module 14 performs a signaling interaction with the network side device, so that the non-access stratum module 12 transfers a non-access stratum message in GSM with the access stratum module 13 and the access stratum module 14 to which mapping is performed.

The user equipment in this embodiment may change a mapping relationship between the non-access stratum module 12 and the access stratum module 13 as well as the access stratum module 14 according to configuration information, which resolves a technical problem that a mapping relationship between an access stratum and a non-access stratum that are in prior-art user equipment is fixed; in a case in which a network standard of a non-access stratum message does not change, the access stratum module 13 and the access stratum module 14 may be switched, which therefore can reduce signaling interactions and shorten a delay when an air interface is switched.

Figure 2:
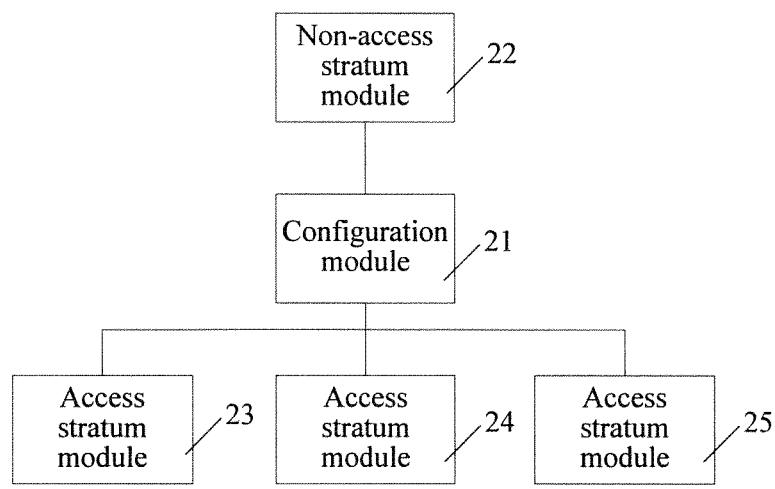
FIG. 2 is a schematic structural diagram of a second embodiment of user equipment according to the present invention.

Refer to FIG. 2, which is a schematic structural diagram of a second embodiment of user equipment according to the present invention. The user equipment includes a configuration module 21, a non-access stratum module 22, an access stratum module 23, an access stratum module 24, and an access stratum module 25. The access stratum module 23, the access stratum module 24, and the access stratum module 25 separately support different network standards.

The configuration module 21 is configured to receive configuration information from a network side device (not shown in the figure) by using the access stratum module 23, the access stratum module 24, or the access stratum module 25, and map the non-access stratum module 22 to at least one of the access stratum module 23, the access stratum module 24, and the access stratum module 25 according to the configuration information, so that the non-access stratum module 22 transfers a non-access stratum message with the access stratum module 23, the access stratum module 24, or the access stratum module 25 to which mapping is performed.

In this embodiment, the non-access stratum module 22 is mapped to both the access stratum module 24 and the access stratum module 25. Therefore, the access stratum module 24 and the access stratum module 25 are configured to receive a non-access stratum message from the network side device, and send the non-access stratum message to the non-access stratum module 22, to process the non-access stratum message. The non-access stratum module 22 is configured to generate a non-access stratum message, and send the non-access stratum message to the access stratum module 24 or the access stratum module 25, and the access stratum module 24 or the access stratum module 25 sends the non-access stratum message to the network side device.

Even though the non-access stratum module 22 is mapped to both the access stratum module 24 and the access stratum module 25, only one access stratum module is needed to perform a signaling interaction between the user equipment and the network side device. In this embodiment, the configuration module 21 is further configured to specify, according to the configuration information, the access stratum module 24 or the access stratum module 25 to receive a non-access stratum message from the network side device or to send a non-access stratum message to the network side device. The network side device notifies, according to a specific status of a network, the user equipment which access stratum module is more suitable for a signaling interaction; therefore, when the network side device generates the configuration information, the configuration information indicates an access stratum module that performs a signaling interaction with the network side device.

In another embodiment, the configuration module 21 is further configured to compare priorities of the access stratum module 24 and the access stratum module 25, and select an access stratum module that has a highest priority to receive a non-access stratum message from the network side device or to send a non-access stratum message to the network side device. The priority is preferably quality of transmission between the access stratum module 24 as well as the access stratum module 25 and the network side device, that is, transmission quality of an air interface, and includes signal quality, transmission bandwidth, and the like. If the configuration information does not indicate which access stratum module should be used by the user equipment to perform a signaling interaction, the user equipment needs to determine one access stratum module. An access stratum module has multiple types of parameters to represent priorities of the access stratum module, and the configuration module 21 compares priories of the access stratum module 24 and the access stratum module 25 by using these parameters, and selects the access stratum module that has the highest priority from the access stratum module 24 and the access stratum module 25 to perform a signaling interaction. The priority may also be a correspondence between an access stratum module and a non-access stratum module, for example, if a network standard of the non-access stratum module is GSM, the configuration module 21 selects an access stratum module whose network standard is GSM.

Figure 3:
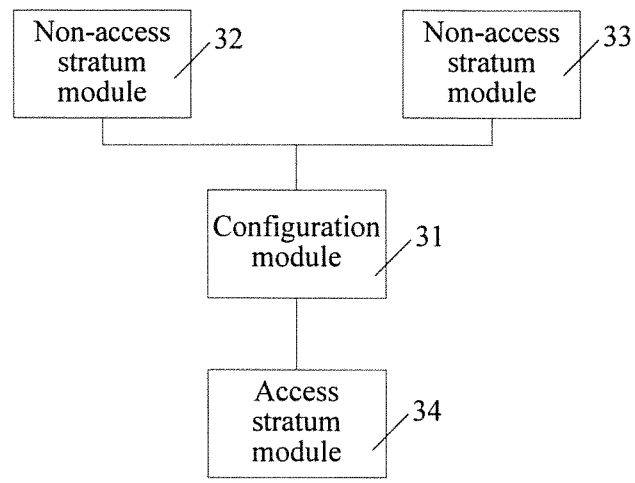
FIG. 3 is a schematic structural diagram of a third embodiment of user equipment according to the present invention.

Refer to FIG. 3, which is a schematic structural diagram of a third embodiment of user equipment according to the present invention. The user equipment includes a configuration module 31, a non-access stratum module 32, a non-access stratum module 33, and an access stratum module 34. The non-access stratum module 32 and the non-access stratum module 33 separately support different network standards.

The configuration module 31 is configured to acquire configuration information, and map the access stratum module 34 to at least one of the non-access stratum module 32 and the non-access stratum module 33 according to the configuration information, so that the access stratum module 34 transfers a non-access stratum message with the non-access stratum module 32 and/or the non-access stratum module 33 to which mapping is performed.

Because the user equipment needs to be connected to a network so as to embody a communication function of the user equipment, in this embodiment, the configuration information is received from a network side device (not shown in the figure) by the access stratum module 34, and is sent to the configuration module 31.

When the user equipment is in an initialized state, the configuration module 31 can also acquire the configuration information, and the configuration module 31 establishes a default mapping relationship between the access stratum module 34 and the non-access stratum module 32 as well as the non-access stratum module 33 according to the configuration information. For example, if the access stratum module 34 and the non-access stratum module 32 support a same network standard, the access stratum module 34 is mapped to the non-access stratum module 32. In this embodiment, the network standard supported by the access stratum module 34 is GSM, UMTS, LTE, or WIFI. Network standards supported by the non-access stratum module 32 and the non-access stratum module 33 are UMTS, GSM, or LTE.

When the user equipment accesses a network, a network side device of the network adds the configuration information to dedicated signaling, a system message, or the like, so that the user equipment may receive the configuration information when accessing the network.

Because the access stratum module 34 is mapped to at least one of the non-access stratum module 32 and the non-access stratum module 33, it indicates that the access stratum module 34 not only may be mapped to the non-access stratum module 32 or the non-access stratum module 33, but also may be mapped to both the non-access stratum module 32 and the non-access stratum module 33. An application scenario of this embodiment is described below in detail by using two cases.

Assuming that the user equipment is in an initialized state, the access stratum module 34 is mapped to the non-access stratum module 32, the network standards supported by the access stratum module 34 and the non-access stratum module 32 are both LTE, and the network standard supported by the non-access stratum module 33 is GSM.

Case 1: The user equipment accesses a GSM network, where the GSM network can mutually transmit non-access stratum message in GSM with the user equipment only through an air interface in LTE because of mobility, a service, or the like, that is, the user equipment can process a non-access stratum message only by using the non-access stratum module 33.

After receiving the configuration information from the network side device, the access stratum module 34 of the user equipment sends the configuration information to the configuration module 31; the configuration module 31 maps the access stratum module 34 to the non-access stratum module 33 according to the configuration information, and the access stratum module 34 performs a signaling interaction with the network side device, so that the non-access stratum module 33 transfers a non-access stratum message in GSM with the access stratum module 34.

Case 2: The user equipment accesses a network including a GSM network and an LTE network, and the network may mutually transmit non-access stratum message in GSM or a non-access stratum message in LTE with the user equipment through an air interface in LTE, that is, the user equipment needs to process the non-access stratum message in GSM by using the non-access stratum module 33, and also needs to process the non-access stratum message in LTE by using the non-access stratum module 32.

After receiving the configuration information from the network side device, the access stratum module 34 of the user equipment sends the configuration information to the configuration module 31; the configuration module 31 maps the access stratum module 34 to both the non-access stratum module 33 and the non-access stratum module 33 according to the configuration information, and the access stratum module 34 performs a signaling interaction with the network side device, so that the non-access stratum module 32 and the non-access stratum module 33 transfer a non-access stratum message with the access stratum module 34.

Figure 4:
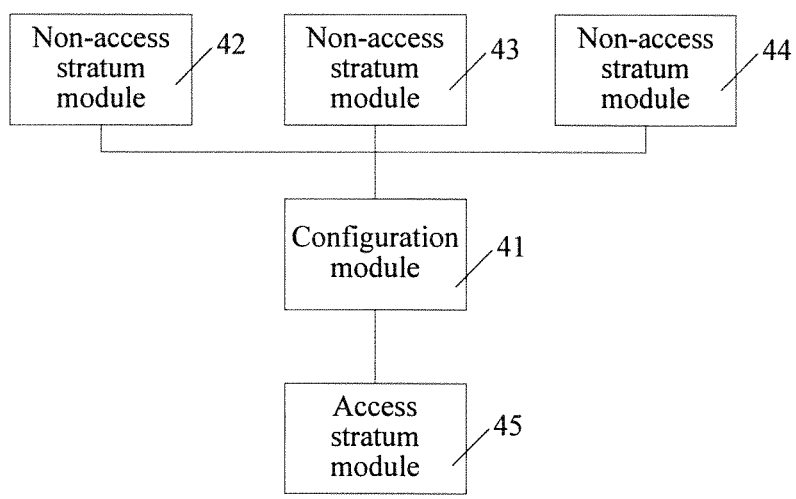
FIG. 4 is a schematic structural diagram of a fourth embodiment of user equipment according to the present invention.

Refer to FIG. 4, which is a schematic structural diagram of a fourth embodiment of user equipment according to the present invention. The user equipment includes a configuration module 41, a non-access stratum module 42, a non-access stratum module 43, a non-access stratum module 44, and an access stratum module 45. The non-access stratum module 42, the non-access stratum module 43, and the non-access stratum module 44 separately support different network standards.

The configuration module 41 is configured to receive configuration information from a network side device (not shown in the figure) by using the access stratum module 45, and map the access stratum module 45 to at least one of the non-access stratum module 42, the non-access stratum module 43, and the non-access stratum module 44 according to the configuration information, so that the access stratum module 45 transfers a non-access stratum message with the non-access stratum module 42, the non-access stratum module 43, and the non-access stratum module 44 to which mapping is performed.

In this embodiment, the access stratum module 45 is mapped to both the non-access stratum module 43 and the non-access stratum module 44. Therefore, the access stratum module 45 is configured to receive a non-access stratum message from the network side device, and send the non-access stratum message to the non-access stratum module 43 or the non-access stratum module 44 for processing. Specifically, because non-access stratum messages received by the access stratum module 45 may be in different network standards, and the non-access stratum module 43 and the non-access stratum module 44 each can process a non-access stratum message in only one network standard, the access stratum module 45 is specifically configured to receive a non-access stratum message from the network side device, parse a network standard of the non-access stratum message, and send the non-access stratum message to the non-access stratum module 43 or the non-access stratum module 44 that corresponds to the network standard, to process the non-access stratum message. When sending non-access stratum messages, most of network side devices need to set network standards of the non-access stratum messages. Specifically, the network side device generates network standard indication information of a non-access stratum message, so as to indicate a network standard of the non-access stratum message, where the network standard indication information may be included in the non-access stratum message, or may be included in an access stratum message carrying the non-access stratum message. When receiving the non-access stratum message, the access stratum module 45 can determine the network standard of the non-access stratum message according to the network standard indication information. In addition, the network side device may also not set the network standard of the non-access stratum message, and add the non-access stratum message to an access stratum message that corresponds to the network standard of the non-access stratum message; the access stratum module 45 receives the access stratum message, and may determine the network standard of the non-access stratum message according to the access stratum message, for example, for a non-access stratum message in a network standard A, an access stratum message in the network standard A is used, and for a non-access stratum message in a network standard B, an access stratum message in the network standard B is used. Corresponding access stratum messages A and B both exist in air interfaces in different network standards.

The non-access stratum module 43 or the non-access stratum module 44 is configured to generate a non-access stratum message, and send the non-access stratum message to the access stratum module 45, and the access stratum module 45 sends the non-access stratum message to the network side device.

Figure 5:
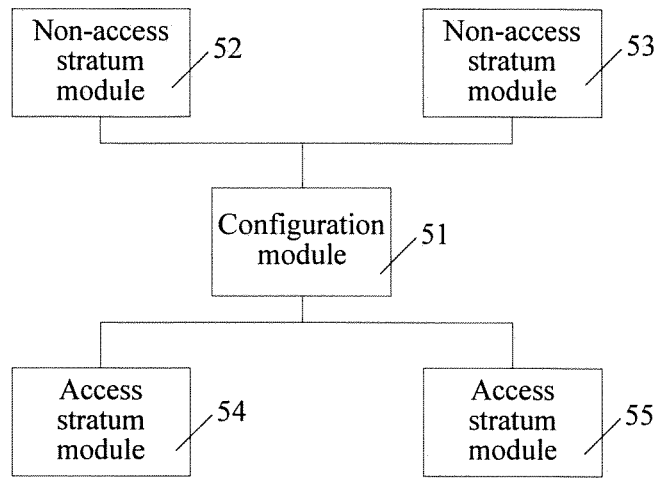
FIG. 5 is a schematic structural diagram of a fifth embodiment of user equipment according to the present invention.

Refer to FIG. 5, which is a schematic structural diagram of a fifth embodiment of user equipment according to the present invention. The user equipment includes a configuration module 51, a non-access stratum module 52, a non-access stratum module 53, an access stratum module 54, and an access stratum module 55. The non-access stratum module 52 and the non-access stratum module 53 separately support different network standards, and the access stratum module 54 and the access stratum module 55 separately support different network standards. In this embodiment, the network standards supported by the access stratum module 54 and the access stratum module 55 are UMTS, GSM, LTE, or WIFI, and the network standards supported by the non-access stratum module 52 and the non-access stratum module 53 are UMTS, GSM, or LTE.

The configuration module 51 is configured to receive configuration information from a network side device (not shown in the figure) by using one of the access stratum module 54 and the access stratum module 55, map the non-access stratum module 52 to at least one of the access stratum module 54 and the access stratum module 55 according to the configuration information, and map the non-access stratum module 53 to at least one of the access stratum module 54 and the access stratum module 55 according to the configuration information, so that the non-access stratum module 52 and the non-access stratum module 53 separately transfer a non-access stratum message with the access stratum module 54 or the access stratum module 55 to which mapping is performed. In this embodiment, both the non-access stratum module 52 and the non-access stratum module 53 are mapped to both the access stratum module 54 and the access stratum module 55.

When the user equipment is in an initialized state and before the user equipment accesses a network, a related module in the user equipment automatically generates configuration information, and the configuration module 51 establishes default mapping relationships between the non-access stratum module 52 and the access stratum module 54 as well as the access stratum module 55, and between the non-access stratum module 53 and the access stratum module 54 as well as the access stratum module 55 according to the configuration information. For example, if the non-access stratum module 52 and the access stratum module 54 support a same network standard, and the non-access stratum module 53 and the access stratum module 55 support a same network standard, the non-access stratum module 52 is mapped to the access stratum module 54, and the non-access stratum module 53 is mapped to the access stratum module 55.

The access stratum module 54 or the access stratum module 55 is configured to receive a non-access stratum message from the network side device, and send the non-access stratum message to the non-access stratum module 52 or the non-access stratum message 53, to process the non-access stratum message. Both the access stratum module 54 and the access stratum module 55 can receive the non-access stratum message, indicating that air interfaces in two network standards exist between the user equipment and the network, so that the network side device can send non-access stratum messages in two network standards.

Specifically, the access stratum module 54 or the access stratum module 55 is configured to receive a non-access stratum message from the network side device, parses a network standard of the non-access stratum message, and send the non-access stratum message to the non-access stratum module 52 or the non-access stratum module 53 that corresponds to the network standard, to process the non-access stratum message. When sending the non-access stratum message, the network side device sets the network standard of the non-access stratum message.

The non-access stratum module 52 or the non-access stratum module 53 is configured to generate a non-access stratum message, and send the non-access stratum message to the access stratum module 54 or the access stratum module 55 to which mapping is performed, and the access stratum module 54 or the access stratum module 55 to which mapping is performed sends the non-access stratum message to the network side device. Because both the non-access stratum module 52 and the non-access stratum module 53 are mapped to both the access stratum module 54 and the access stratum module 55, the user equipment needs to select an access stratum module to receive and send the non-access stratum message. Specifically, when the non-access stratum module 52 or the non-access stratum module 53 generates the non-access stratum message, the configuration module 51 is further configured to set the network standard of the non-access stratum message, so that the network side device parses the network standard of the non-access stratum message after receiving the non-access stratum message. A manner for setting, by the configuration module 51, the network standard of the non-access stratum message may be generating network standard indication information of the non-access stratum message, so as to indicate the network standard of the non-access stratum message, and the network standard indication information may be included in the non-access stratum message, or may be included in an access stratum message carrying the non-access stratum message. When receiving the non-access stratum message, the network side device can determine the network standard of the non-access stratum message according to the network standard indication information.

In this embodiment, the configuration module 51 is further configured to specify, according to the configuration information, one of the access stratum module 54 and the access stratum module 55 to receive a non-access stratum message from the network side device or to send a non-access stratum message to the network side device. In another embodiment, the configuration module 51 is further configured to compare a priority of the access stratum module 54 or the access stratum module 55, and select the access stratum module 54 or the access stratum module 55 that has a highest priority to receive a non-access stratum message from the network side device or to send a non-access stratum message to the network side device.

It should be understood that, user equipment in this embodiment exemplarily includes only two non-access stratum modules and two access stratum modules; however, in more embodiments, user equipment may include three or more non-access stratum modules and three or more access stratum modules. Network standards supported by these non-access stratum modules are different from each other, and network standards supported by these access stratum modules are also different from each other. Each non-access stratum module may be mapped to one, two, or more access stratum modules, which therefore is applicable to cases of networking of a network in multiple network standards, improves universality, and is easy to promote.

Figure 6:
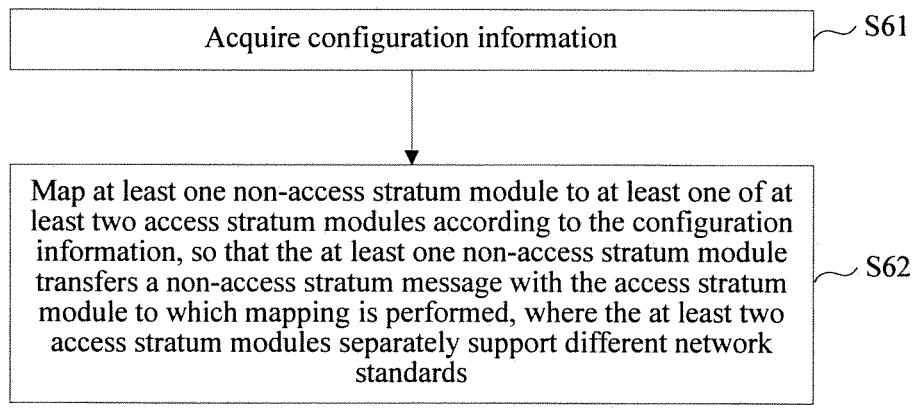
FIG. 6 is a schematic flowchart of a first embodiment of a method for processing a non-access stratum message according to the present invention.

Refer to FIG. 6, which is a schematic flowchart of a first embodiment of a method for processing a non-access stratum message according to the present invention. The method for processing a non-access stratum message includes the following steps:

Step S61: Acquire configuration information.

The configuration information in this embodiment is received from a network side device by one of at least two access stratum modules. The network side device may add the configuration information to dedicated signaling, a system message, or the like. The access stratum module, as a module allowing user equipment to be connected to a network, may receive dedicated signaling or a system message broadcast by the network side device, and then parse out the configuration information from the dedicated signaling or the system message.

Step S62: Map at least one non-access stratum module to at least one of at least two access stratum modules according to the configuration information, so that the at least one non-access stratum module transfers a non-access stratum message with the access stratum module to which mapping is performed, where the at least two access stratum modules separately support different network standards.

If the configuration information is sent by the network side device, the configuration information indicates a network standard of a non-access stratum message sent by the network, and a network standard of an air interface for transmitting the non-access stratum message. Therefore, a mapping relationship may be established between a non-access stratum module and a corresponding access stratum module according to the configuration information, so that the non-access stratum module may receive and process the non-access stratum message by using the access stratum module.

If there are two access stratum modules, the non-access stratum module may be mapped to one of the access stratum modules or may be mapped to the two access stratum modules. If there are more than two access stratum modules, the non-access stratum module may further be mapped to at least two access stratum modules.

If there are two or more non-access stratum modules, each non-access stratum module may be mapped to one of the access stratum modules or may be mapped to at least two access stratum modules.

In this embodiment, a process in which the at least one non-access stratum module transfers the non-access stratum message with the access stratum module to which mapping is performed is divided into downlink steps and uplink steps.

The downlink steps include: receiving, by the access stratum module to which mapping is performed, the non-access stratum message from the network side device; and sending the non-access stratum message to the at least one non-access stratum module for processing.

The uplink steps include: generating, by the at least one non-access stratum module, the non-access stratum message; sending the non-access stratum message to the access stratum module to which mapping is performed; and sending, by the access stratum module to which mapping is performed, the non-access stratum message to the network side device.

Figure 7:
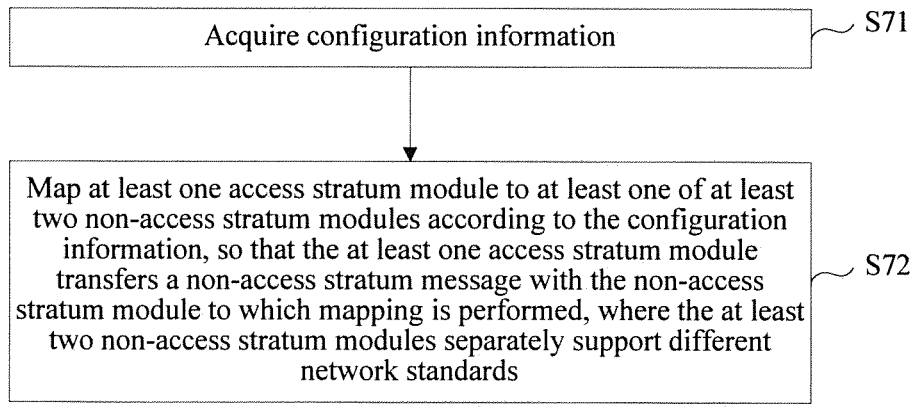
FIG. 7 is a schematic flowchart of a second embodiment of a method for processing a non-access stratum message according to the present invention.

Refer to FIG. 7, which is a schematic flowchart of a second embodiment of a method for processing a non-access stratum message according to the present invention. The method for processing a non-access stratum message includes the following steps:

Step S71: Acquire configuration information.

The configuration information in this embodiment is received from a network side device by an access stratum module. The network side device may add the configuration information to dedicated signaling, a system message, or the like. The access stratum module, as a module allowing user equipment to be connected to a network, may receive dedicated signaling or a system message broadcast by the network side device, and then parse out the configuration information from the dedicated signaling or the system message.

Step S72: Map at least one access stratum module to at least one of at least two non-access stratum modules according to the configuration information, so that the at least one access stratum module transfers a non-access stratum message with the non-access stratum module to which mapping is performed, where the at least two non-access stratum modules separately support different network standards.

If the configuration information is sent by the network side device, the configuration information indicates a network standard of a non-access stratum message sent by the network, and a network standard of an air interface for transmitting the non-access stratum message. Therefore, a mapping relationship may be established between an access stratum module and a corresponding non-access stratum module according to the configuration information, so that the non-access stratum module may receive and process the non-access stratum message by using the access stratum module.

If there are two non-access stratum modules, the two non-access stratum modules may process non-access stratum messages in two network standards, and the access stratum module may be mapped to one of the non-access stratum modules or may be mapped to the two non-access stratum modules. If there are more than two non-access stratum modules, the access stratum module may be mapped to at least two non-access stratum modules.

If there are two or more access stratum modules, each access stratum module may be mapped to one of the non-access stratum modules or may be mapped to the at least two non-access stratum modules.

In this embodiment, a process in which the at least one access stratum module transfers the non-access stratum message with the non-access stratum module to which mapping is performed is divided into downlink steps and uplink steps.

The downlink steps include: receiving, by the at least one access stratum module, the non-access stratum message from the network side device; and sending the non-access stratum message to the non-access stratum module to which mapping is performed, to process the non-access stratum message.

The uplink steps include: generating, by the non-access stratum module to which mapping is performed, the non-access stratum message; sending the non-access stratum message to the at least one access stratum module; and sending, by the at least one access stratum module, the non-access stratum message to the network side device.

Figure 8:
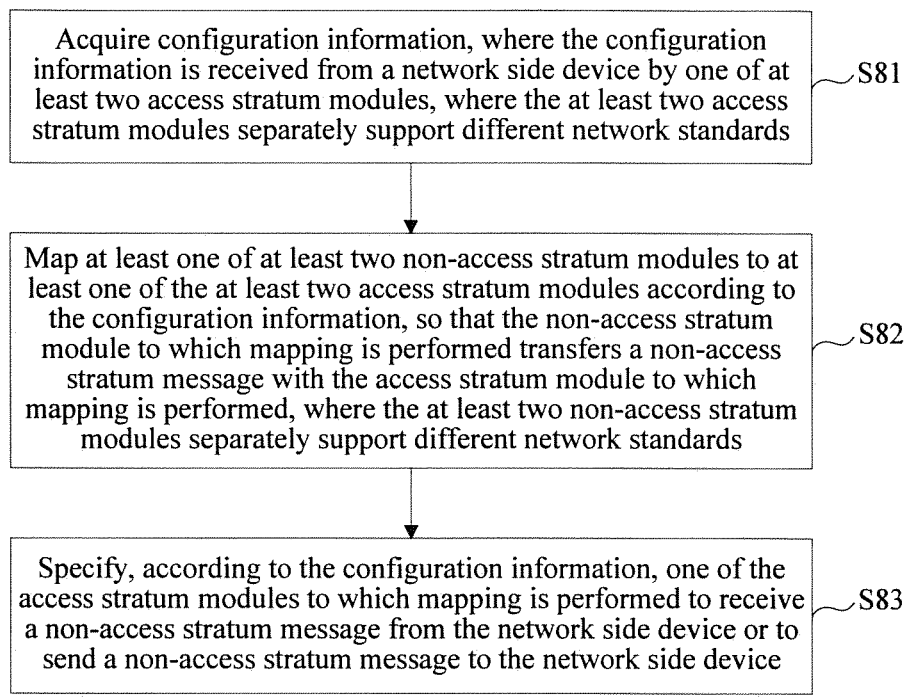
FIG. 8 is a schematic flowchart of a third embodiment of a method for processing a non-access stratum message according to the present invention.

Refer to FIG. 8, which is a schematic flowchart of a third embodiment of a method for processing a non-access stratum message according to the present invention. The method for processing a non-access stratum message includes the following steps:

Step S81: Acquire configuration information, where the configuration information is received from a network side device by one of at least two access stratum modules, where the at least two access stratum modules separately support different network standards.

The network side device may add the configuration information to dedicated signaling, a system message, or the like. The access stratum module, as a module allowing user equipment to be connected to a network, may receive dedicated signaling or a system message broadcast by the network side device, and then parse out the configuration information from the dedicated signaling or the system message.

Step S82: Map at least one of at least two non-access stratum modules to at least one of the at least two access stratum modules according to the configuration information, so that the non-access stratum module to which mapping is performed transfers a non-access stratum message with the access stratum module to which mapping is performed, where the at least two non-access stratum modules separately support different network standards.

The network standards supported by the at least two access stratum modules are UMTS, GSM, LTE, or WIFI, and the network standards supported by the at least two non-access stratum modules are UMTS, GSM, or LTE.

The configuration information sent by the network side device indicates a network standard of a non-access stratum message sent by the network, and a network standard of an air interface for transmitting the non-access stratum message. Therefore, a mapping relationship may be established between a non-access stratum module and a corresponding access stratum module according to the configuration information, so that the non-access stratum module may receive and process the non-access stratum message by using the access stratum module.

If there are at least two access stratum modules and at least two non-access stratum modules, each non-access stratum module may be mapped to one of the access stratum modules or may be mapped to multiple access stratum modules.

Step S83: Specify, according to the configuration information, one of the access stratum modules to which mapping is performed to receive a non-access stratum message from the network side device or to send a non-access stratum message to the network side device.

The configuration information further indicates which access stratum module needs to be used to perform a signaling interaction with the network side device. For example, if the network side device and the access stratum module use an air interface in GSM, the configuration information specifies an access stratum module supporting GSM to perform a signaling interaction with the network side device.

In this embodiment, a process in which the non-access stratum module to which mapping is performed transfers the non-access stratum message with the access stratum module to which mapping is performed includes downlink steps and uplink steps.

The uplink steps include: generating, by the non-access stratum module to which mapping is performed, the non-access stratum message; sending the non-access stratum message to the access stratum module to which mapping is performed; and sending, by the access stratum module to which mapping is performed, the non-access stratum message to the network side device. Because the network side device corresponds to a core network having multiple network standards, after the network side device receives one non-access stratum message, the non-access stratum message needs to be sent to a corresponding core network for processing. Therefore, in the uplink steps, when the non-access stratum module to which mapping is performed generates the non-access stratum message, the method further includes: setting a network standard of the non-access stratum message, so that the network side device parses the network standard of the non-access stratum message after receiving the non-access stratum message; therefore, the non-access stratum message may be sent to a core network that corresponds to the network standard.

The downlink steps include: receiving, by the access stratum module to which mapping is performed, the non-access stratum message from the network side device; and sending the non-access stratum message to the non-access stratum module to which mapping is performed, to process the non-access stratum message. Because there are at least two non-access stratum modules, after receiving one non-access stratum message, the access stratum module needs to know that the non-access stratum message is sent to which non-access stratum module for processing. Therefore, the downlink steps specifically include: receiving, by the access stratum module to which mapping is performed, the non-access stratum message from the network side device; parsing a network standard of the non-access stratum message; and sending the non-access stratum message to the non-access stratum module to which mapping is performed and that corresponds to the network standard, to process the non-access stratum message.

Figure 9:
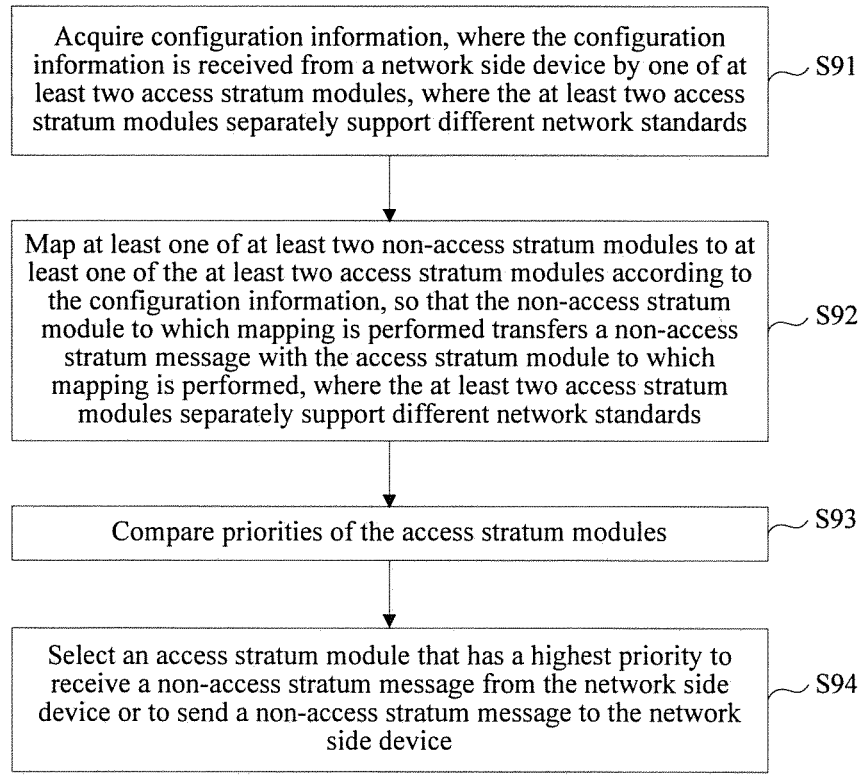
FIG. 9 is a schematic flowchart of a fourth embodiment of a method for processing a non-access stratum message according to the present invention.

Refer to FIG. 9, which is a schematic flowchart of a fourth embodiment of a method for processing a non-access stratum message according to the present invention. The method for processing a non-access stratum message includes the following steps:

Step S91: Acquire configuration information, where the configuration information is received from a network side device by one of at least two access stratum modules, where the at least two access stratum modules separately support different network standards.

Step S92: Map at least one of at least two non-access stratum modules to at least one of the at least two access stratum modules according to the configuration information, so that the non-access stratum module to which mapping is performed transfers a non-access stratum message with the access stratum module to which mapping is performed, where the at least two non-access stratum modules separately support different network standards.

Technical features of steps S91 and S92 in this embodiment are the same as those of steps S81 and S82 in the previous embodiment, and are not described herein again.

Step S93: Compare priorities of the access stratum modules.

The priority is preferably quality of transmission between the access stratum module and the network side device.

Step S94: Select an access stratum module that has a highest priority to receive a non-access stratum message from the network side device or to send a non-access stratum message to the network side device.

If the non-access stratum module is mapped to at least two access stratum modules, one access stratum module needs to be selected from these access stratum modules to receive and send the non-access stratum message. Each access stratum module has a priority, and the access stratum module having the highest priority is used as the selected access stratum module.

In this embodiment, a process in which the non-access stratum module to which mapping is performed transfers a non-access stratum message with the access stratum module to which mapping is performed includes downlink steps and uplink steps. The downlink steps and the uplink steps are the same as the uplink steps and the downlink steps of the previous embodiment, and are not described herein again.

Figure 10:
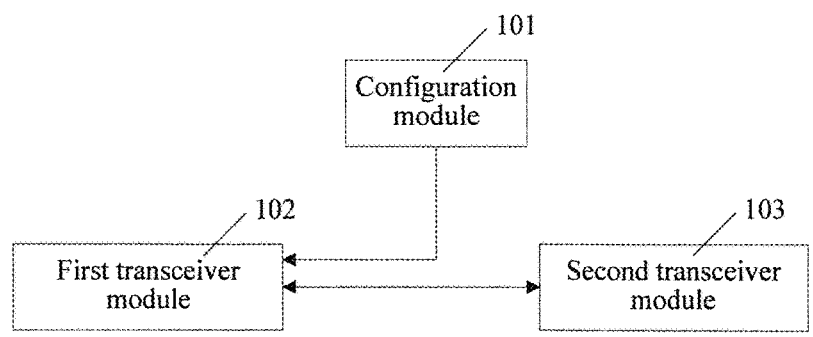
FIG. 10 is a schematic structural diagram of an embodiment of a network side device according to the present invention.

Refer to FIG. 10, which is a schematic structural diagram of an embodiment of a network side device according to the present invention.

The network side device is configured to connect user equipment to at least one core network. The network side device includes a configuration module 101, a first transceiver module 102, and a second transceiver module 103. Specifically, the network side device is configured to forward, to the core network, a non-access stratum message sent by the user equipment or send, to the user equipment, a non-access stratum message sent by the core network.

The configuration module 101 is configured to generate configuration information, and send the configuration information to the first transceiver module 102. A network standard of the non-access stratum message processed by the user equipment corresponds to a network standard of the core network accessed by the network side device, a network standard of an air interface between the user equipment and the network side device corresponds to a network standard of the first transceiver module 102, and the configuration information can be generated according to the network standard of the core network and the network standard of the first transceiver module 102.

The first transceiver module 102 is configured to receive the configuration information from the configuration module 10, and send the configuration information to the user equipment, so that the user equipment maps, according to the configuration information, at least one non-access stratum module to at least one of at least two access stratum modules or map at least one access stratum module to at least one of at least two non-access stratum modules. The at least two non-access stratum modules separately support different network standards, and the at least two access stratum modules separately support different network standards. For example, if the network standards of the core network include GSM and LTE, the network standard of the first transceiver module 102 is GSM and UMTS, the user equipment respectively map both a non-access stratum module in GSM and a non-access stratum module in LTE to an access stratum module in GSM and an access stratum module in UMTS.

After the user equipment completes mapping, the non-access stratum module to which mapping is performed and the access stratum module to which mapping is performed that are in the user equipment may receive or send a non-access stratum message through an air interface.

The second transceiver module 103 is configured to receive the non-access stratum message from the core network, and send an access stratum message to the first transceiver module 102. A network standard of the non-access stratum message is determined by the core network. The first transceiver module 102 is further configured to receive a non-access stratum message from the second transceiver module 103, set a network standard of the non-access stratum message, and send the non-access stratum message to the user equipment, so that the user equipment parses the network standard of the non-access stratum message, and selects the non-access stratum module that corresponds to the network standard, to process the non-access stratum message. When setting the network standard of the non-access stratum message, the first transceiver module 102 may generate network standard indication information of the non-access stratum message, where the network standard indication information of the non-access stratum message may be included in the non-access stratum message, or may be included in an access stratum message carrying the non-access stratum message, so that the user equipment parses out the network standard of the non-access stratum message.

Because the network side device may access several access networks at the same time, network standards of the access networks are different. Therefore, in this embodiment, the first transceiver module 102 is further configured to receive a non-access stratum message from the user equipment, and send the non-access stratum message to the second transceiver module 103. The second transceiver module 103 is further configured to receive the non-access stratum message from the first transceiver module 102, parse the network standard of the non-access stratum message, and send the non-access stratum message to a core network that corresponds to the network standard. The network standard of the non-access stratum message is set by the user equipment, and the user equipment may generate network standard indication information of the non-access stratum message, where the network standard indication information of the non-access stratum message may be included in the non-access stratum message, or may be included in an access stratum message carrying the non-access stratum message, so that the second transceiver module 103 parses out the network standard of the non-access stratum message.

Figure 11:
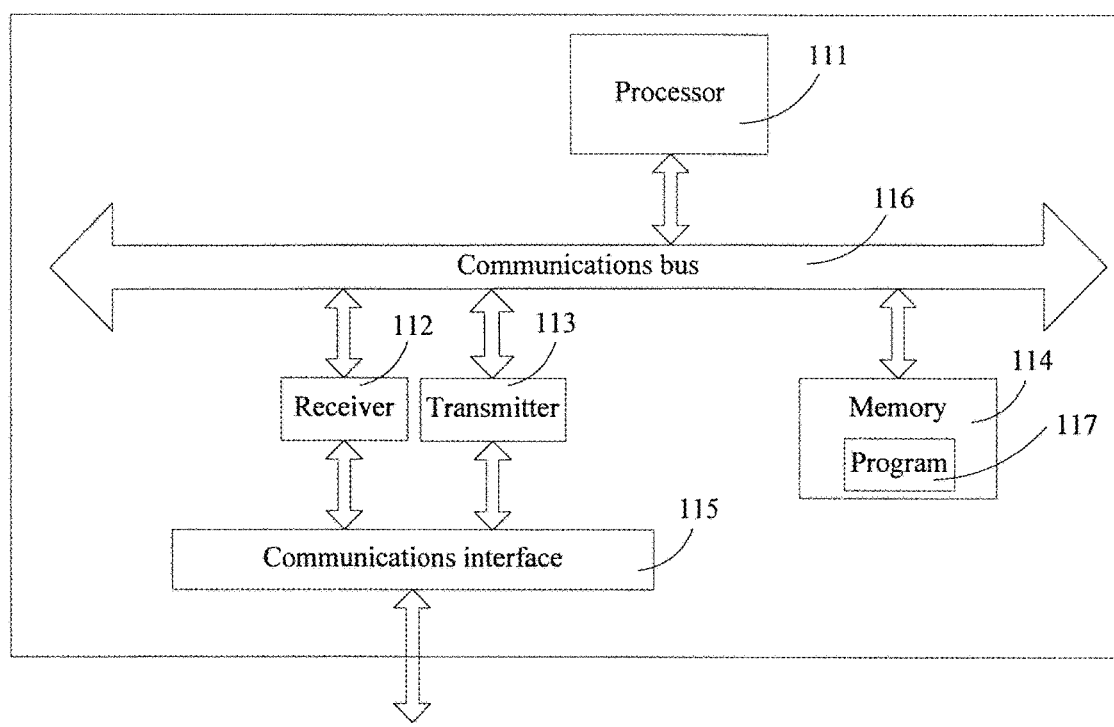
FIG. 11 is a schematic structural diagram of a sixth embodiment of user equipment according to the present invention.

Refer to FIG. 11, which is a schematic structural diagram of a sixth embodiment of user equipment according to the present invention.

The user equipment includes a processor 11, a receiver 112, a transmitter 113, a memory 114, and a communications interface 115.

The processor 111, the receiver 112, the transmitter 113, the memory 114, and the communications interface 115 are all connected to a power supply, and the processor 111, the receiver 112, the transmitter 113, the memory 114, and the communications interface 115 communicate with each other by using a communications bus 116.

The communications interface 115 is configured to establish a connection to a network side device (not shown in the figure).

The receiver 112 is configured to receive configuration information and a non-access stratum message from the network side device.

The transmitter 113 is configured to send a non-access stratum message to the network side device.

The receiver 112 and the transmitter 113 are equivalent to an access stratum module supporting one network standard. In another embodiment, the user equipment may further include another receiver and transmitter.

The processor 111 has at least one baseband, each baseband supports one network standard, and each baseband is equivalent to a non-access stratum module supporting one network standard.

The processor 111 may be a central processing unit CPU, or an application specific integrated circuit ASIC (Application Specific Integrated Circuit), or is configured as one or more integrated circuits for implementing the implementation manners of the present invention.

The memory 114 is configured to store data processed by the processor 111. If the implementation manners of the present invention are implemented by using a software program, the memory 114 is further configured to store a program 117 needing to be executed by the processor 111. Specifically, the program 117 may include program code, where the program code includes a computer operation instruction.

The memory 114 may include a high speed RAM memory, or may include a non-volatile memory (non-volatile memory), such as at least one magnetic disk storage.

The processor 111 is further configured to execute the program 117, and specifically, the program 117 includes:
  acquiring, by the processor 111, configuration information, and operating the receiver 112 and the transmitter 113 according to the configuration information, where this process is equivalent to mapping the at least one baseband to the receiver 112 and the transmitter 113; and
  transferring, by the operated receiver 112 and transmitter 113, a non-access stratum message with the at least one baseband in the processor 111.

The configuration information may be received from the network side device through the communications interface 115 by the processor 111 operating the receiver 112, or may be received from the memory 114 by the processor 111. If the configuration information is received from the memory 114, when setting is performed on the user equipment before delivery, the configuration information is already set in the memory 114. Each time the user equipment is powered on, the processor 111 receives the configuration information from the memory 114.

For a specific implementation of the program 117, reference may be made to the user equipment and the method for processing a non-access stratum message in the foregoing embodiments, and details are not described herein again.

In another embodiment, the user equipment includes at least two basebands, and includes at least a receiver 112 and a transmitter 113, and a program 119 includes:

acquiring, by the processor 111, configuration information, and enabling, by the processor 111, at least one of the at least two basebands according to the configuration information, where this process is equivalent to mapping the receiver 112 and the transmitter 113 to at least one of the at least two basebands; and transferring, by the receiver 112 and the transmitter 113, a non-access stratum message with at least one of the at least two basebands in the processor 111.

The configuration information may be received from the network side device through the communications interface 115 by the processor 111 operating the receiver 112, or may be received from the memory 114 by the processor 111.

In the several embodiments provided in the present invention, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a management server, or a network side device) or a processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. User equipment, comprising:
    a processor, at least one non-access stratum module, and at least two access stratum modules, the at least two access stratum modules separately support different network standards, each of the at least one non-access stratum module comprising a baseband of the processor, each of the at least two access stratum modules comprising a receiver and a transmitter;
    wherein the processor is configured to acquire configuration information, and change a mapping of the at least one non-access stratum module to at least one of the access stratum modules according to the configuration information;
    wherein when there are at least two access stratum modules to which mapping is performed, the processor is further configured to compare priorities of the access stratum modules to which mapping is performed, and select a first access stratum module to which mapping is performed and that has a highest priority to receive a non-access stratum message from a network side device or to send a non-access stratum message to the network side device; and
    wherein the at least one non-access stratum module is configured to transfer the non-access stratum message with the first access stratum module to which mapping is performed.

2. The user equipment according to claim 1, wherein the configuration information is received from the network side device by one of the access stratum modules, and is sent to the processor.

3. The user equipment according to claim 2, wherein the first access stratum module to which mapping is performed is configured to receive the non-access stratum message from the network side device, and send the non-access stratum message to the at least one non-access stratum module, to process the non-access stratum message.

4. The user equipment according to claim 2, wherein: the at least one non-access stratum module is configured to generate the non-access stratum message, and send the non-access stratum message to the first access stratum module to which mapping is performed; and
    the first access stratum module to which mapping is performed is configured to send the non-access stratum message to the network side device.

5. The user equipment according to claim 4, wherein, the processor is further configured to specify, according to the configuration information, the first access stratum module to which mapping is performed.

6. The user equipment according to claim 1, wherein the priority of each access stratum module to which mapping is performed comprises a quality of transmission between the access stratum module to which mapping is performed and the network side device.

7. The user equipment according to claim 1, wherein when there are at least two non-access stratum modules which support different network standards, the first access stratum module to which mapping is performed is configured to receive the non-access stratum message from the network side device, parse a network standard of the non-access stratum message, and send the non-access stratum message to the non-access stratum module that corresponds to the network standard, to process the non-access stratum message.

8. A method for processing a non-access stratum message, performed by user equipment, wherein the user equipment comprises at least one non-access stratum module and at least two access stratum modules, each of the at least one non-access stratum module comprising a baseband of a processor, each of the at least two access stratum modules comprising a receiver and a transmitter, the method comprising:
acquiring configuration information;
changing a mapping of the at least one non-access stratum module to at least one of the access stratum modules according to the configuration information;
when there are at least two access stratum modules to which mapping is performed, comparing priorities of the access stratum modules to which mapping is performed, and selecting a first access stratum module to which mapping is performed and that has a highest priority to receive a non-access stratum message from a network side device or to send a non-access stratum message to the network side device; and
transferring the non-access stratum message between the at least one non-access stratum module and the first access stratum module to which mapping is performed, wherein the at least two access stratum modules separately support different network standards.

9. The method according to claim 8, further comprising: receiving the configuration information from the network side device by one of the access stratum modules.

10. The method according to claim 9, wherein transferring, by the at least one non-access stratum module, the non-access stratum message with the first access stratum module to which mapping is performed comprises:
receiving, by the first access stratum module to which mapping is performed, the non-access stratum message from the network side device; and
sending the non-access stratum message to the at least one non-access stratum module, to process the non-access stratum message.

11. The method according to claim 9, wherein transferring the non-access stratum message between the at least one non-access stratum module and the first access stratum module to which mapping is performed comprises:
generating, by the at least one non-access stratum module, the non-access stratum message;
sending the non-access stratum message to the first access stratum module to which mapping is performed; and
sending, by the first access stratum module to which mapping is performed, the non-access stratum message to the network side device.

12. The method according to claim 11, wherein when there are at least two access stratum modules to which mapping is performed, the method further comprises:
specifying, according to the configuration information, the first access stratum module to which mapping is performed.

13. The processing method according to claim 8, wherein the priority of each access stratum module to which mapping is performed comprises a quality of transmission between the access stratum module to which mapping is performed and the network side device.

14. The processing method according to claim 8, wherein when there are at least two non-access stratum modules which support different network standards, transferring the non-access stratum message between the at least one non-access stratum module and the first access stratum module to which mapping is performed comprises:
receiving, by the first access stratum module to which mapping is performed, the non-access stratum message from the network side device;
parsing a network standard of the non-access stratum message; and
sending the non-access stratum message to a non-access stratum module that corresponds to the network standard, to process the non-access stratum message.

15. A network side device configured to connect user equipment to at least one core network, wherein the user equipment comprises at least one non-access stratum module and at least two access stratum modules, wherein the at least two access stratum modules separately support different network standards, wherein each of the at least one non-access stratum module comprises a baseband of a processor, wherein each of the at least two access stratum modules comprises a receiver and a transmitter, the network side device comprising:
a processor configured to generate configuration information; and
a first transceiver configured to receive the configuration information from the processor, and send the configuration information to the user equipment, wherein the configuration information is configured to enable the user equipment to change a mapping, according to the configuration information, of the at least one non-access stratum module to at least one of the access stratum modules,
wherein when there are at least two access stratum modules to which mapping is performed, the first transceiver is further configured to receive a non-access stratum message from a first access stratum module of the user equipment or to send a non-access stratum message to the first access stratum module of the user equipment, wherein the first access stratum module is selected according to a highest priority among priorities of the access stratum modules to which mapping is performed.

16. The network side device according to claim 15, wherein:
the network side device further comprises a second transceiver configured to receive the non-access stratum message from a core network, and send the non-access stratum message to the first transceiver; and
the first transceiver is further configured to receive the non-access stratum message from the second transceiver, set a network standard of the non-access stratum message, and send the non-access stratum message to the user equipment for parsing the network standard of the non-access stratum message.

17. The network side device according to claim 16, wherein:
the first transceiver is further configured to receive the non-access stratum message from the user equipment, and send the non-access stratum message to the second transceiver; and
the second transceiver is further configured to receive the non-access stratum message from the first transceiver, parse the network standard of the non-access stratum message, and send the non-access stratum message to a core network that corresponds to the network standard.

* * * * *

UNITED STATES PATENT AND TRADEMARK OFFICE
CERTIFICATE OF CORRECTION

PATENT NO. : 9,866,682 B2  Page 1 of 1
APPLICATION NO. : 15/054543
DATED : January 9, 2018
INVENTOR(S) : Pingping Xing It is certified that error appears in the above-identified patent and that said Letters Patent is hereby corrected as shown below:

On the Title Page

Please add:
-- Related U.S. Application Data
Continuation of application PCT/CN2013/082647, filed Aug. 30, 2013 --

Signed and Sealed this
Twenty-seventh Day of March, 2018

Andrei Iancu
*Director of the United States Patent and Trademark Office*